Sept. 18, 1928.
W. H. GREEN
1,684,822
WATER TREATMENT APPARATUS
Filed Dec. 4, 1919
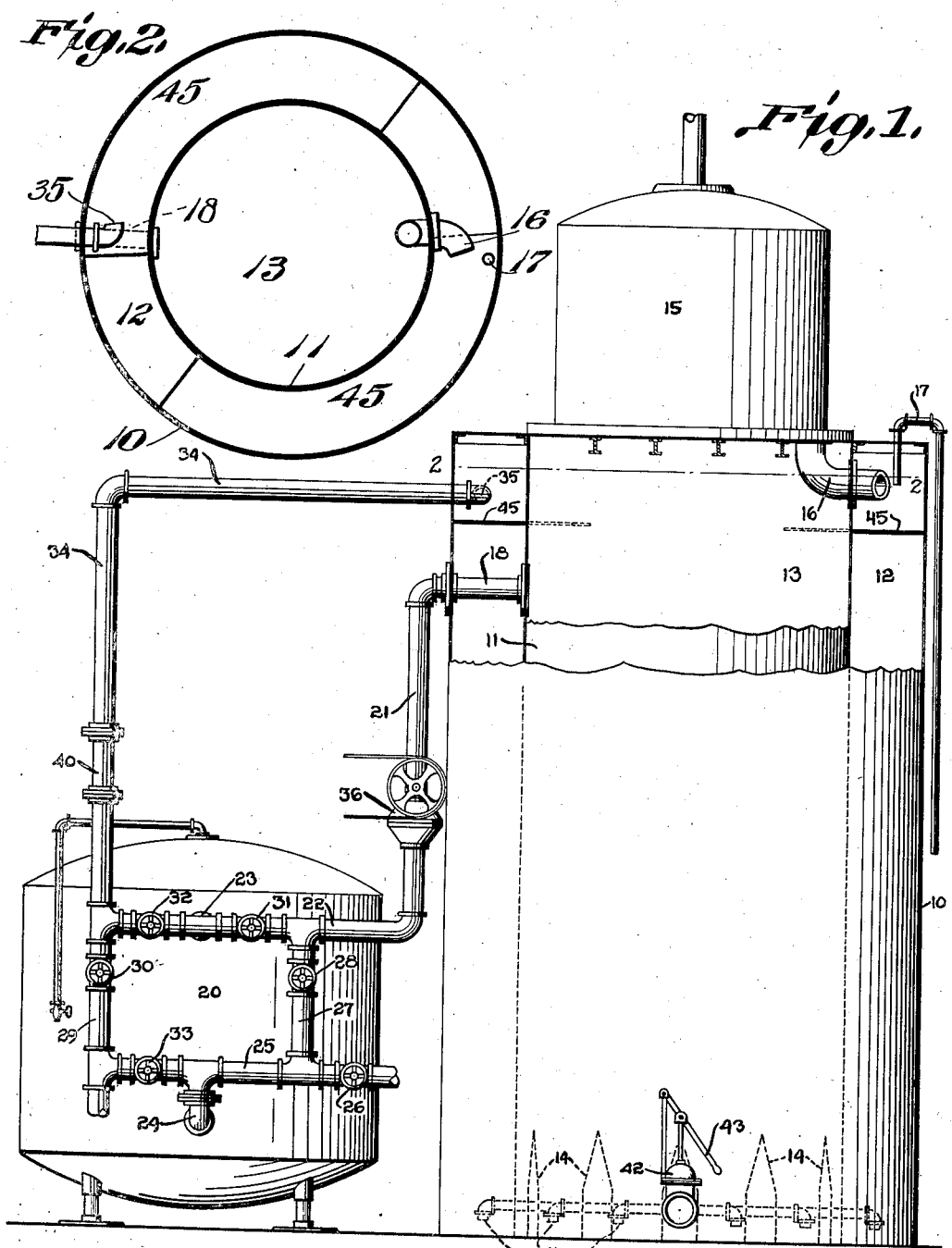
WITNESS:
R. L. Greist
INVENTOR:
WALTER H. GREEN
BY Cromwell, Greist & Warden
ATTORNEYS Patented Sept. 18, 1928.

1,684,822

UNITED STATES PATENT OFFICE.

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

WATER-TREATMENT APPARATUS.

Application filed December 4, 1919. Serial No. 342,349.

This invention has to do with the provision of apparatus for use in connection with precipitation processes of softening water, particularly, apparatus which may be used advantageously in hot water treatments. In certain methods of water treatment, water to which lime and soda or other softening reagents have been added, is held for a time in a settling tank in order that the precipitate formed by the hardening constituents and the reagents may gravitate and separate out. After leaving the settling tank, the softened water may be passed through a filter for the purpose of collecting any suspended solids still remaining. In many instances it is desirable to heat the raw water preliminary to the chemical treatment, to expedite the reactions, or for other purposes, and it has been found that types of apparatus heretofore employed for the treating of cool water are not always uniformly effective in the treatment of hot water. It has been found that due to possible variations in the temperature of the raw water supplied for treatment, and to other circumstances, portions of the water may pass through the treating and sedimentation tanks more rapidly than other portions, with the result that the effluent water will vary in its degree of clarification and in the extent to which it is free of hardening content.

One of the objects of the present invention is the provision of an improved apparatus which will maintain approximate uniformity of water passed through it, irrespective of the variations in the temperature of the raw water.

Another object is the provision of a construction which will minimize the adverse effects of convection currents in the sedimentation chambers and promote a constant and regular flow of the water through the apparatus, so that all of the water will be subjected to substantially the same duration of treatment and sedimentation.

Another object is the provision of an apparatus whereby a filter, through which the clarified water from a sedimentation tank is filtered, may be backwashed periodically with clarified water from the sedimentation tank, and the wash water returned to the sedimentation tank for removal of the sludge and conservation of the water, without interfering with the normal process of sedimentation carried on in the tank.

Still another object is the provision of such an apparatus wherein the supply of clarified or softened water for use need not be interrupted during the backwashing operation.

Still another object of the invention is the provision of improved apparatus for the softening and clarifying of water which will contribute to uniformity in both volume and quality of the output.

With these and other objects in view, which will appear as the nature of the improvements is better understood, the invention resides in the novel construction, combination and arrangement of the parts pointed out in the appended claims.

The disclosure herein, being indicative of a preferred embodiment of the invention, is to be considered as illustrative, and not as limiting or restricting the application of the principles thereof, for obviously the invention is susceptible of embodiment in other forms of apparatus. This application is a continuation, in part, of my copending application, Serial No. 285,381, filed March 26, 1919.

In the drawing Fig. 1 is a composite view, showing the lower portion of the settling tank in elevation and the upper portion in vertical section, the filter in elevation and the water supply and distributing pipes and connections in detail.

Fig. 2 is a cross section substantially on the line 2—2 of Fig. 1 but on a reduced scale.

In the drawing the numeral 10 designates a tank preferably in the form of a cylinder into which raw water and a softening agent are introduced for mixing. It has been determined, through experience, that in hot water treatment, the dimensions of the softening tank should be such as to contain a volume of water approximately equal to that which the apparatus will treat in one hour. Theoretically, in a tank of such capacity, each particle of water would require an hour's time to pass from the inlet to the outlet. However, as a result of inevitable changes in the temperature of water delivered to the tank, convection currents are formed, which, unless counteracted, will short circuit some of the flow directly to the outlet, with the result that it will not be subjected to the full period of treatment and sedimentation. In the present apparatus, provision is made for retaining the water in the tank sufficiently long for reaction and precipitation, regardless of the nature of temperature changes, as follows.

Within tank 10, is disposed a concentric partition or shell 11, dividing said tank into two compartments or chambers 12 and 13, having their water-containing spaces of approximately equal areas, so that they will be of substantially equal capacity. Communication between the compartments is established through a series of apertures 14 in the lower end of partition 11. These apertures are of even size and have their upper portions shaped similar to an inverted V and terminating substantially at a common level.

Water to be treated is preliminarily passed through a heater 15 of any approved style and which may conveniently be fixed to the top of the tank 10. After leaving the heater it enters the top of chamber 12 through inlet pipe 16, being directed tangentially against the wall of tank 10, so as to take a revolving course in chamber 12. Softening agents are introduced into the water through chemical supply pipe 17. Upon reaching the bottom of chamber 12 the water passes through the apertures 14 into chamber 13 eventually rising therein and passing out through outlet pipe 18 near the top thereof.

Assuming a quantity of water somewhat cooler than that in the tank 10 is introduced through inlet 16, it will naturally reach the bottom of chamber 12 more quickly than the warmer water in advance of it which is passing through said chamber at the regular velocity of flow. However, upon reaching the bottom and passing into chamber 13, flow of the colder water to the outlet will be retarded to the normal velocity, for in its upward movement it will not pass through the warmer column of water in chamber 13. Conversely, if, as is the usual case, the water entering through inlet 16 is warmer than that in chamber 12, it will not pass through the underlying body of cooler water, but will reach the bottom of chamber 12 when the water below it has passed into the chamber 13. In either case, chambers 12 and 13 being of approximately equal area, the water has been caused to remain in the tank sufficiently long to allow for reaction with the chemicals and sedimentation.

The peculiar design of apertures 14 adds materially to the efficiency of the apparatus in avoiding the localizing of discharge from the chamber 12 to the chamber 13. In tanks of ordinary construction it has been noticed that if there be only a slight variation in the height of the opening or openings through which the water passes from one chamber to another on its way to the outlet, practically all of the warmer water will pass through the higher opening, thus establishing localized warm water currents in chamber 12. With my present construction slight variations in the height of apertures 14 are of no consequence because of the small area of the contracted upper portions thereof. The result is that the flow from chamber 12 to chamber 13 is approximately evenly distributed through all of these openings in partition 11.

When a filter is used for filtering the effluent from the sedimentation tank, it is desirable to arrange for the backwashing of the filter with hot water, in order to conserve the heat which the filter contains, and also to facilitate the subsequent clarifying of the backwash water and permit the conservation of it and the heat which it retains. The drawing shows an arrangement whereby this may be accomplished.

The filter is represented generally by numeral 20. The internal construction and arrangement thereof may be of any approved design and therefore is not shown in detail.

Water leaving tank 10 by way of outlet 18 flows to the filter through pipe 21 and its course therefrom is directed by a series of valves and communicating pipes.

Pipe 22 which is in direct communication with pipe 21 is positioned above the surface of the filter bed (not shown). An open ended spur pipe 23 takes the water from pipe 22 and discharges it above the filter bed. After filtering through the bed, the water enters a lower spur pipe 24, and then pipe 25, passing through a valve 26 in one end thereof to the point of use. Connection between pipes 22 and 25 is established by pipe 27 the latter being provided with a valve 28. Pipe 29 having a valve 30 is for waste. Valves 31 and 32 are provided in pipe 22 on each side of the connection with spur pipe 23. Valve 33 in pipe 25 is disposed between the connections with spur pipe 24 and waste pipe 29. Return to the tank 10 is through pipe 34, which is operatively connected to pipe 22. As shown in the drawing in dotted lines the open end 35 of pipe 34 discharges into the upper end of compartment 12 in a direction to induce revolution of the water corresponding to that discharged from inlet 16. In some instances it may be desired to discharge the water returning through pipe 34 into the heater 15, which is permissible and is contemplated as a modification of the application of the invention.

When the arrangement is as shown in the drawing, a horizontal baffle plate or shelf 45 is provided below each of the inlets 16 and 35 for the purpose of limiting the agitation caused by the inrushing water and dissipating the currents incident thereto by distributing the influent water laterally.

In filtering, the valves 28, 32 and 33 are closed and 31 and 26 opened, the course of water being as heretofore stated. When it is desired to clean or back-wash the filter, valves 31, 33 and 30 are closed and 28 and 32 opened. Valve 26 may be left open at all times.

In backwashing, the course of the water is through pipes 21 and 22 to pipe 27, through the latter to pipe 25 where it divides, some going through valve 26 to use, and the remainder the other way through spur pipe 24, up through the filter bed and out through spur pipe 23, valve 32 and pipe 34 back to the tank 10.

If desired, the valve 30 may be opened during the first part of the backwashing operation in order that the heaviest discharge of sludge from the filter bed may be carried away through the waste pipe 29. A sight glass 40 in pipe 34 will prove advantageous as the progress being made in cleaning the filter may be noted by a glance at the water passing therethrough.

In order to effect the desired circulation from the tank, through the filter and back to the tank, and to inject the water with sufficient pressure to loosen the sludge in the filter bed when cleaning, an auxiliary pump 36 of any suitable type is placed in cooperative relation with pipe 21, to be operated during backwashing. Incidental to this plan of circulation, a considerable amount of concentrated sludge will occasionally be projected into the tank 10. With the low viscosity of hot water to be taken into consideration the importance of the provisions I have made for dissipation of agitation and for insurance of ample time for precipitation and settling will be appreciated.

The sludge which has separated out and collected at the bottom of tank 10 may be removed through draw-off pipes 41 controlled by a suitable valve 42 which is operated from the outside of the tank through lever 43.

In the normal operation of the device, the inflow of water at the top of the chamber 12, and the outflow at the top of chamber 13, produces a general downward movement of the water in the first mentioned chamber and an upward movement thereof in the latter. Due to the direction imparted by the arrangement of the inlet 16, the actual movement of the water in chamber 12 assumes a helical course, the water, as it progresses, losing some of its heat through the outer casing 10 and into the water in chamber 13. This helical movement of the water tends to prevent the formation of convection currents in chamber 12 and co-operates with the openings 14 to secure uniform transfer of water from chamber 12 into chamber 13 at all sides of the latter. The envelopment of chamber 13 by the water in chamber 12 is effective to prevent loss of heat from the water in the former and to raise its temperature slightly as it rises toward the outlet. This prevents the formation of convection currents in the water in chamber 13 and maintains its rising movement at a uniform rate. The retention of water in the chamber 12 during the period necessary to displace that in the chamber 13 gives time for the mixture and reaction of the softening agents with the hardening constituents in the water, and more or less sedimentation, so that when that water enters the bottom of chamber 13 and rises at a uniform rate and in a tranquil state therein, the best possible conditions are afforded for the complete settling of the suspended material. By virtue of the co-operation of these several factors, substantial uniformity is attained both in the course of travel taken by all the water passing through the apparatus and the conditions as to temperature and clarity in which the water is discharged therefrom. Consequently the filter is retained at substantially uniform temperature, and its operation periods between backwashings are kept uniform, all of which contribute to uniformity in the temperature, softness, and clarity of the water supplied to the point of use. The back-washing operations, which of course are of but short duration, do not interfere with the performance of the settling apparatus, as the back-wash water upon its return to the chamber 12 takes the normal course of the raw water undergoing treatment and is discharged in clarified condition as a part of the output of the apparatus. Inasmuch as it already has once been treated with the softening agents, its introduction into the tank 12 does not require variation in the dosage of the raw water, and the sludge which it carries is already in condition for precipitation and aids in precipitation of material from the raw water with which it is commingled.

I claim:

1. Water treatment apparatus comprising a settling tank having inlet and outlet chambers of substantially equal capacity and uniform cross section and in open communication at the lower ends thereof, means for introducing water to be clarified to the upper end of said inlet chamber, means for withdrawing said water when clarified from the upper end of said outlet chamber, a filter, means for directing clarified water through said filter to the point of use, and means for directing clarified water through said filter in the reverse direction and returning the same to the upper end of the inlet chamber of said tank.

2. Water treatment apparatus comprising a settling tank having inlet and outlet portions in communication, means for introducing water to be treated at the inlet portion, means for withdrawing said water when treated from the outlet portion, a filter, means for directing treated water from the tank through the filter to the point of use, means for directing treated water from said tank through said filter in the reverse direction and returning the same to the inlet portion, and means in the tank for retarding passage of water from the inlet portion to the outlet portion.

3. Water treatment apparatus comprising a cylindrical softening tank having an inner concentric partition provided with a series of apertures in the lower end thereof, each of said apertures being gradually contracted at its upper end, means for introducing water to be treated against the upper inner periphery of the tank at a slight angle thereto, an outlet pipe in the upper end of said partition for withdrawing said water when treated, a filter, a pipe connecting said outlet pipe with said filter, means for passing treated water through the filter to the point of use, means for passing treated water through said filter in the reverse direction, a pipe for conveying said water back to the upper end of said tank and means for introducing it therein at an angle corresponding to that at which untreated water is supplied.

4. Water treatment apparatus comprising a tank having an inner chamber and an outer chamber, one of said chambers being provided with an inlet adjacent its upper portion and the other chamber being provided with an outlet adjacent its upper portion, said chambers being in communication adjacent their lower portions solely through a series of similar apertures occupying a substantially uniform level, said apertures decreasing in width toward their upper limits, and a baffle arranged to distribute water from the inlet laterally in the inlet chamber.

5. Water treatment apparatus comprising a tank having an inner chamber, and an outer annular chamber in communication with the inner chamber at their lower portions, an outlet at the upper portion of the inner chamber, an inlet to the upper portion of the annular chamber discharging in a substantially horizontal tangential direction, and a directing shelf disposed in the annular chamber immediately below and in advance of the inlet.

6. Water treatment apparatus comprising a tank having an inner chamber, and an outer annular chamber, in communication with the inner chamber at their lower portions, an inlet to the upper portion of the annular chamber discharging in a substantially horizontal tangential direction, a directing shelf disposed immediately below and in advance of the inlet, a supplemental treatment device, a conduit leading thereto from the inner chamber, a return conduit therefrom to the upper portion of the outer chamber and discharging in the same general direction as the inlet, and a directing shelf immediately below and in advance of said return conduit discharge.

7. Water treatment apparatus comprising a sedimentation tank, a filter, means for withdrawing treated water from the tank and passing the same through the filter to the point of use, means for circulating treated water from the tank reversely through the filter and back to said tank, and means within said tank to distribute laterally therein the water returned from the filter.

8. Water treatment apparatus comprising a sedimentation tank, a filter, means for withdrawing treated water from the tank and passing the same through the filter to the point of use, means for circulating treated water from the tank reversely through the filter and back to said tank, means within said tank to distribute therein the water returned from the filter, said means including a baffle disposed immediately below the point at which said returning water enters the tank.

9. In water treating apparatus the combination of an inner chamber, an outer chamber encompassing the same, one of said chambers being provided with an inlet at its upper portion arranged to induce revolving movement of water in said chamber, the other of said chambers being provided with an outlet at its upper portion, said chambers being in communication at their lower portion through a series of apertures distributed perimetrically of the inner chamber, said apertures decreased in width toward their upper limits.

10. In water treating apparatus the combination of an inner chamber, an outer chamber enclosing the inner chamber, said outer chamber being provided with an inlet at its upper portion, the other chamber being provided with an outlet at its upper portion, said chambers being in communication at the bottom through a plurality of apertures of equal height distributed perimetrically of the inner chamber, the vertical extent of said apertures being materially greater than their horizontal extent and the width of said apertures decreasing toward their upper limits.

11. In water treating apparatus, in combination, an inflow receptacle, an outflow receptable disposed concentrically therein, said receptacles affording chambers of substantially equal capacity and uniform cross section and having their only intercommunication at their bottom, a heater arranged to discharge heated water into the upper portion of the inflow receptacle and means for withdrawing water from the upper portion of the outflow receptacle.

12. In water treating apparatus, in combination, an inflow receptacle, an outflow receptacle disposed concentrically therein, said receptacles affording chambers of substantially equal and uniform area throughout their height and having their only intercommunication at their bottom, means for introducing heated water into the upper portion of the inflow receptacle and means for withdrawing water from the upper portion of the outflow receptacle and means for introducing treating material into the inflow receptacle.

13. In water treating apparatus, in combination, an external receptacle, an internal receptacle disposed concentrically therein to afford an inflow chamber intermediate the walls of the two receptacles, said inflow chamber being of substantially the same capacity as the chamber of the internal receptacle, said chambers being of substantially uniform cross section and in communication at different points about the bottom of the internal receptacle, means for introducing heated water into the upper portion of the inflow chamber for passage downwardly therein, means for withdrawing water from the upper portion of the internal chamber, and means for supplying treating material into the inflow chamber.

14. In water treating apparatus, in combination, an external receptacle, an internal receptacle disposed concentrically therein to afford an inflow chamber between the receptacles, said internal receptacle affording an unobstructed outflow chamber of substantially uniform cross section and of capacity substantially equal to the inflow chamber, said chambers having their only intercommunication at the bottom of the receptacles, means for introducing heated water into the upper portion of the inflow chamber, means for withdrawing water from the upper portion of the outflow chamber, a filter, and connections between the filter and said chambers for withdrawing water from the upper portion of the outflow chamber and conducting water to the upper portion of the inflow chamber.

15. In water treating apparatus, the combination with a heater, of an inflow tank arranged to receive water therefrom through an inlet at the upper portion of said tank, an outflow tank disposed concentrically in the inflow tank and arranged to receive water into its lower portion from the lower portion of the inflow tank, said outflow tank being provided with an outlet adjacent its upper portion below the level of the inlet, and said tanks being of substantially equal capacity and uniform cross section.

16. In water treating apparatus, the combination with a heater, of a tank affording an inflow chamber and an outflow chamber of substantially equal capacity, the respective chambers being of uniform cross section from top to bottom, said inflow chamber affording an inlet at its upper portion for delivery of water thereinto from the heater, said outflow chamber being provided with an outlet at its upper portion for discharge of water therefrom and said chambers being in communication at their bottom portions only.

17. In apparatus of the class described, the combination with a heater, of a receptacle affording an outflow chamber and an inflow chamber encompassing the outflow chamber, said chambers being of substantially equal capacity and uniform cross section from top to bottom and being in communication at their bottom portions, the inflow chamber being provided with an inlet at its upper portion for delivery of water from the heater, a baffle arranged to distribute water from said inlet laterally in the inflow chamber and the outflow chamber being provided with an outlet at its upper portion for discharge of water therefrom.

18. In water treating apparatus, the combination with a heater of a receptacle affording an outflow chamber of substantial vertical height and an inflow chamber encompassing the same, said chambers being of uniform cross section and having communication at their bottom portions through circumferentially distributed apertures and being also of substantially equal capacity, the inflow chamber being provided with an inlet at its upper portion for delivery of water from the heater, a baffle under the inlet, the outflow chamber being provided with an outlet at its upper portion for discharge of water therefrom, and means at the bottom portions of said chambers for permitting discharge of sludge therefrom.

19. In apparatus of the class described, in combination, an inflow chamber, an outflow chamber, said chambers being in communication only at their bottoms, means for supplying heated water into the upper end of the inflow chamber, a water outlet communicating with the outflow chamber near the top thereof, a filter, means for passing water from the outlet through the filter for clarification of same, means for conducting water from the outlet reversely through the filter for backwashing of the latter, and means for returning the backwash water to the upper portion of the inflow chamber.

20. In water-treatment apparatus, in combination, a tank affording an annular inflow chamber and an outflow chamber encompassed by the inflow chamber, said chambers being in communication at their bottoms and being of approximately equal area, means for supplying heated water into the upper end of the inflow chamber, and the outflow chamber being provided with a water outlet near its top.

In witness whereof I have hereunto signed my name.

WALTER H. GREEN.